United States Patent
Sato (10) Patent No.: US 11,851,048 B2
(45) Date of Patent: Dec. 26, 2023

(54) CONTROL APPARATUS FOR HYBRID ELECTRIC VEHICLE

(71) Applicant: TOYOTA JIDOSHA KABUSHIKI KAISHA, Toyota (JP)

(72) Inventor: Hiroki Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 17/643,587

(22) Filed: Dec. 9, 2021

(65) Prior Publication Data
US 2022/0185262 A1    Jun. 16, 2022

(30) Foreign Application Priority Data
Dec. 10, 2020  (JP) .................. 2020-205382

(51) Int. Cl.
*B60W 20/50* (2016.01)
*F02N 11/08* (2006.01)
*B60K 6/26* (2007.10)

(52) U.S. Cl.
CPC ......... *B60W 20/50* (2013.01); *F02N 11/0848* (2013.01); *F02N 11/0862* (2013.01); *B60K 6/26* (2013.01); *B60K 2006/268* (2013.01); *B60W 2510/244* (2013.01); *B60Y 2200/92* (2013.01); *B60Y 2300/192* (2013.01)

(58) Field of Classification Search
CPC .. B60W 20/50; B60W 50/02; B60W 50/0205; B60K 2006/268; B60Y 2200/92; F02D 41/0047; F02D 2200/0418; F02B 29/04
See application file for complete search history.

(56) References Cited

U.S. PATENT DOCUMENTS

| | | | |
|---|---|---|---|
| 7,107,956 B2 * | 9/2006 | McGee | B60W 10/06 180/65.235 |
| 9,102,328 B2 * | 8/2015 | Werner | B60K 6/48 |
| 9,322,378 B2 * | 4/2016 | Lovett | F02N 11/0803 |
| 9,676,292 B2 * | 6/2017 | Orita | B60W 20/00 |
| 10,527,019 B2 * | 1/2020 | Kim | F02N 11/0837 |
| 10,597,024 B2 * | 3/2020 | Khafagy | B60W 20/13 |

(Continued)

FOREIGN PATENT DOCUMENTS

| | | | |
|---|---|---|---|
| JP | 2013180696 A1 * | 9/2013 | Y02T 10/62 |
| JP | 2015067008 A | 4/2015 | |

*Primary Examiner* — Phutthiwat Wongwian
*Assistant Examiner* — Arnold Castro
(74) *Attorney, Agent, or Firm* — HUNTON ANDREWS KURTH LLP (57) ABSTRACT

A control apparatus for a hybrid electric vehicle including an engine, a starter and an electric motor that is connected to an electric storage device through a relay. The control apparatus executes an engine start control to crank and start the engine by using a selected one of the starter and the electric motor. The control apparatus detects presence or absence of failure of the electric motor, when executing the engine start control by using the electric motor with the relay being closed. When detecting the failure of the electric motor, the control apparatus causes the relay to be opened, and to suspend execution of the engine start control by using the electric motor, and is configured, when start of the engine is requested next, to execute the engine start control by using the starter while keeping the relay to be opened.

5 Claims, 2 Drawing Sheets

(56) References Cited

U.S. PATENT DOCUMENTS

| | | | | |
|---|---|---|---|---|
| 2004/0099234 A1* | 5/2004 | Tamai | ............... | B60W 20/10 |
| | | | | 123/179.3 |
| 2007/0113814 A1* | 5/2007 | Tamai | ............. | B60W 30/192 |
| | | | | 290/40 C |
| 2007/0205031 A1* | 9/2007 | Ogata | ................. | B60L 58/12 |
| | | | | 903/902 |
| 2014/0210216 A1* | 7/2014 | Konishi | ........... | F02N 11/0803 |
| | | | | 290/38 R |

\* cited by examiner

CONTROL APPARATUS FOR HYBRID ELECTRIC VEHICLE

This application claims priority from Japanese Patent Application No. 2020-205382 filed on Dec. 10, 2020, the disclosure of which is herein incorporated by reference in its entirety.

FIELD OF THE INVENTION

The present invention relates to a control apparatus for a hybrid electric vehicle, and more particularly, to a control apparatus for a hybrid electric vehicle in which an engine can be started by either a starter or an electric motor.

BACKGROUND OF THE INVENTION

There is a hybrid electric vehicle that is provided with an engine, a starter and an electric motor, wherein a selected one of the starter and the electric motor is used to crank and start the engine. JP-2013-180696A discloses, by way of example, a control apparatus for such a hybrid electric vehicle. In the control apparatus disclosed in the Japanese Patent Application Publication, the engine is started by the starter, in a case in which start of the engine cannot be made by either the electric motor or push starting, upon request for the engine start.

SUMMARY OF THE INVENTION

By the way, in the hybrid electric vehicle in which, in general, the electric motor is connected through a relay to an electric storage device of a high voltage, there is a possibility that the relay could be fused due to an arcing phenomenon (i.e., arc upon opening of the relay) if the engine is started by the starter with the relay being left closed. For example, the arcing phenomenon could occur when power supply to the relay is cut off by reset made by an HV-ECU in a case in which voltage applied to the starter is reduced upon starting of the engine by the starter.

The present invention was made in view of the background art described above. It is therefore an object of the present invention to make it possible to start the engine by the starter while avoiding the relay from being fused in a case in which the engine cannot be started by the electric motor.

The object indicated above is achieved according to the following aspects of the present invention.

According to a first aspect of the invention, there is provided a control apparatus for a hybrid electric vehicle including an engine, a starter and an electric motor which is connected to an electric storage device through a relay and which is to be rotated with supply of an electric power from the electric storage device, the control apparatus comprising an engine-start control portion configured to execute an engine start control to crank and start the engine by using a selected one of the starter and the electric motor, wherein the engine-start control portion is configured to detect presence or absence of failure of the electric motor, when executing the engine start control by using the electric motor with the relay being closed, and wherein the engine-start control portion is configured, when detecting the failure of the electric motor, to cause the relay to be opened, and to suspend execution of the engine start control by using the electric motor, and is configured, when start of the engine is requested next, to execute the engine start control by using the starter while keeping the relay to be opened, and to cause the relay to be closed after the start of the engine.

According to a second aspect of the invention, in the control apparatus according to the first aspect of the invention, the engine-start control portion includes a memory portion configured to memorize whether the failure of the electric motor is present or absent, wherein the engine-start control portion is configured to execute the engine start control by using the selected one of the starter and the electric motor, which is selected depending on content memorized in the memory portion.

According to a third aspect of the invention, in the control apparatus according to the first or second aspect of the invention, each of the engine and the electric motor is used as a drive power source for driving the vehicle, wherein the electric storage device is configured to output a high voltage not lower than 50V.

According to a fourth aspect of the invention, in the control apparatus according to any one of the first through third aspects of the invention, the starter is to be rotated with supply of the electric power from a second electric storage device that is other than the electric storage device as a first electric storage device, the second electric storage device being configured to output a low voltage lower than a voltage of the first electric storage device, and being used as an electric power source for supplying the electric power to auxiliary devices, wherein the control apparatus comprises a reset control portion configured, when the voltage of the second electric storage device becomes not higher than a predetermined reset determination value, to execute a reset processing for stopping an operation of the starter and causing the relay to be opened.

According to a fifth aspect of the invention, in the control apparatus according to any one of the first through fourth aspects of the invention, the engine-start control portion is configured to execute the engine start control by using the selected one of the starter and the electric motor, when an engine start operation is made by a driver of the vehicle.

In the control apparatus for the hybrid electric vehicle, in the event of detection of failure of the electric motor when the engine start control is to be executed by cranking and starting the engine by using the electric motor with the relay being closed, the engine-start control portion causes the relay to be opened and suspends execution of the engine start control by using the electric motor. Then, when the start of the engine is requested next, the engine start control is executed by using the starter while the relay is kept opened. That is, when the start of the engine cannot be made by the electric motor, the engine is started by the starter with the relay being kept opened, so that there is no risk of occurrence of an arcing phenomenon even in a case in which voltage applied to the starter is reduced upon the start of the engine by the starter, whereby the engine can be appropriately started by the starter, with the relay being avoided from being fused due to the arcing phenomenon.

In the second aspect of the invention, the engine-start control portion includes the memory portion configured to memorize whether the failure of the electric motor is present or absent, and the engine-start control portion is configured to execute the engine start control by using the selected one of the starter and the electric motor, which is selected depending on the content memorized in the memory portion. Owing to this arrangement, the engine can be appropriately started, with the contacts of the relay being avoided from being fused, depending on whether the failure of the electric motor is present or absent.

In the third aspect of the invention, each of the engine and the electric motor is used as a drive power source for driving the vehicle. Since the electric storage device outputs the high voltage that is not lower than 50V, the arcing phenomenon could occur and the relay could be fused due to the arcing phenomenon. Therefore, it is possible to remarkably obtain the effect of the invention that the fusing of the relay contacts due to the arcing phenomenon can be prevented by cranking and starting the engine by the starter while keeping the relay to be opened.

In the fourth aspect of the invention, the starter is to be rotated with supply of the electric power from the second electric storage device which is configured to output the low voltage lower than the high voltage of the above-described electric storage device as the first electric storage device and which is used as the electric power source for supplying the electric power to the auxiliary devices, wherein the control apparatus includes the reset control portion configured, when the voltage of the second electric storage device becomes not higher than the predetermined reset determination value, to execute the reset processing for stopping the operation of the starter and causing the relay to be opened. If the voltage of the second electric storage device is reduced to be not higher than the predetermined reset determination value when the engine is to be cranked and started by the starter with the relay being left closed, the relay could be fused due to the arcing phenomenon that could occur upon execution of the reset processing. Therefore, it is possible to remarkably obtain the effect of the invention that the fusing of the relay contacts due to the arcing phenomenon upon execution of the execution of the reset processing in the event of the voltage reduction can be prevented by cranking and starting the engine by the starter while keeping the relay to be opened.

In the fifth aspect of the invention, the engine start control is executed in response to the engine start operation made by the driver of the vehicle. In a case in which the engine cannot be started by the electric motor as an engine starting means, if the engine starting means is automatically switched from the electric motor to the starter, an uncomfortable feeling could be given to the vehicle driver because the engine start is delayed due to, for example, processing required to open the relay. However, in the fifth aspect of the invention, in the case in which the engine cannot be started by the electric motor, the execution of the engine start control is once suspended, and then the engine start control is executed by using the starter while keeping the relay to be opened when the engine start operation is made next, namely, when the start of the engine is requested next, so that an uncomfortable feeling is unlikely to be given to the vehicle driver.

DETAILED DESCRIPTION OF PREFERRED EMBODIMENT

The present invention is applied to the hybrid electric vehicle including the engine and the electric motor. The engine and the electric motor are used as, for example, drive power sources for driving the vehicle. The engine and the electric motor may be connected to each other through a connecting/disconnecting device such as a clutch, or constantly connected to each other, for example, through a differential gear mechanism such as a planetary gear device. It is possible to employ any one of various arrangements such as an arrangement in which the engine can be cranked by the electric motor. The hybrid electric vehicle may be, for example, a series-type hybrid electric vehicle in which an electric power is to be generated with the electric motor being driven and rotated by the engine and which is to be driven by another electric motor so as to run. The engine is an internal combustion engine such as gasoline engine and diesel engine, which is configured to generate a drive power by combustion of a fuel. The electric motor is preferably a motor generator that is to be used also as an electric generator. However, the electric motor may be a motor that does not have a function serving as the electric generator. A detection or determination of failure of the electric motor may be made, for example, by reading result of diagnosis checking various parts of the electric motor, or alternatively, may be made by the engine-start control portion itself. The failure of the electric motor may be interpreted to mean not only failure of the electric motor itself but also failure of a control circuit such as PCU (power control unit).

The engine-start control portion may be provided with a memory portion configured to memorize whether the failure of the electric motor is present or absent, and the engine-start control portion may be configured to execute the engine start control by using a selected one of the starter and the electric motor, which is selected depending on content memorized in the memory portion, for example, such that the engine start control is executed by using the electric motor when the failure of the electric motor is absent, and such that the engine start control is executed by using the starter when the failure of the electric motor is present. However, the provision of the memory portion is not essential. For example, it is possible to employ an arrangement in which an engine start request is awaited for a predetermined length of time in the event of failure of the electric motor, and the engine start control starts to be executed by using the starter when the engine start request is made. It is also possible to prompt the vehicle driver to newly execute the engine start operation (engine start request), for example, by turning on a failure lamp.

The electric storage device, from which the electric power is to be supplied to the electric motor, is constituted by an electric storage device configured to output a high voltage not lower than 50V. However, the electric storage device may be constituted by an electric storage device configured to output a low voltage lower than 50V. The starter is to be rotated with supply of the electric power from, for example, a second electric storage device which is configured to output a low voltage lower than the high voltage of the above-described electric storage device as a first electric storage device and which is to be used as an electric power source for supplying the electric power to auxiliary devices, and a reset control portion is provided to execute a reset processing for stopping an operation of the starter and causing the relay to be opened, when the voltage of the second electric storage device becomes not higher than a predetermined reset determination value. However, the provision of the reset control portion is not essential. That is, there is a possibility that, upon starting of the engine by the starter, the relay could be opened and the arcing phenomenon could occur in the relay, by a cause other than reduction of the voltage of the second electric storage device. The present invention is effective for such a case, too. Each of the first and second electric storage devices is preferably a battery, but may be a condenser or the like. Further, the engine start control is executed, for example, when the engine start operation is executed by the vehicle driver. However, the present invention is applicable also to an arrangement in which the engine start operation is executed to restart the engine after the engine has been automatically stopped during running or operation of the vehicle.

Embodiment

Hereinafter, there will be described in detail an embodiment of the present invention, with reference to the drawings.

Figure 1:
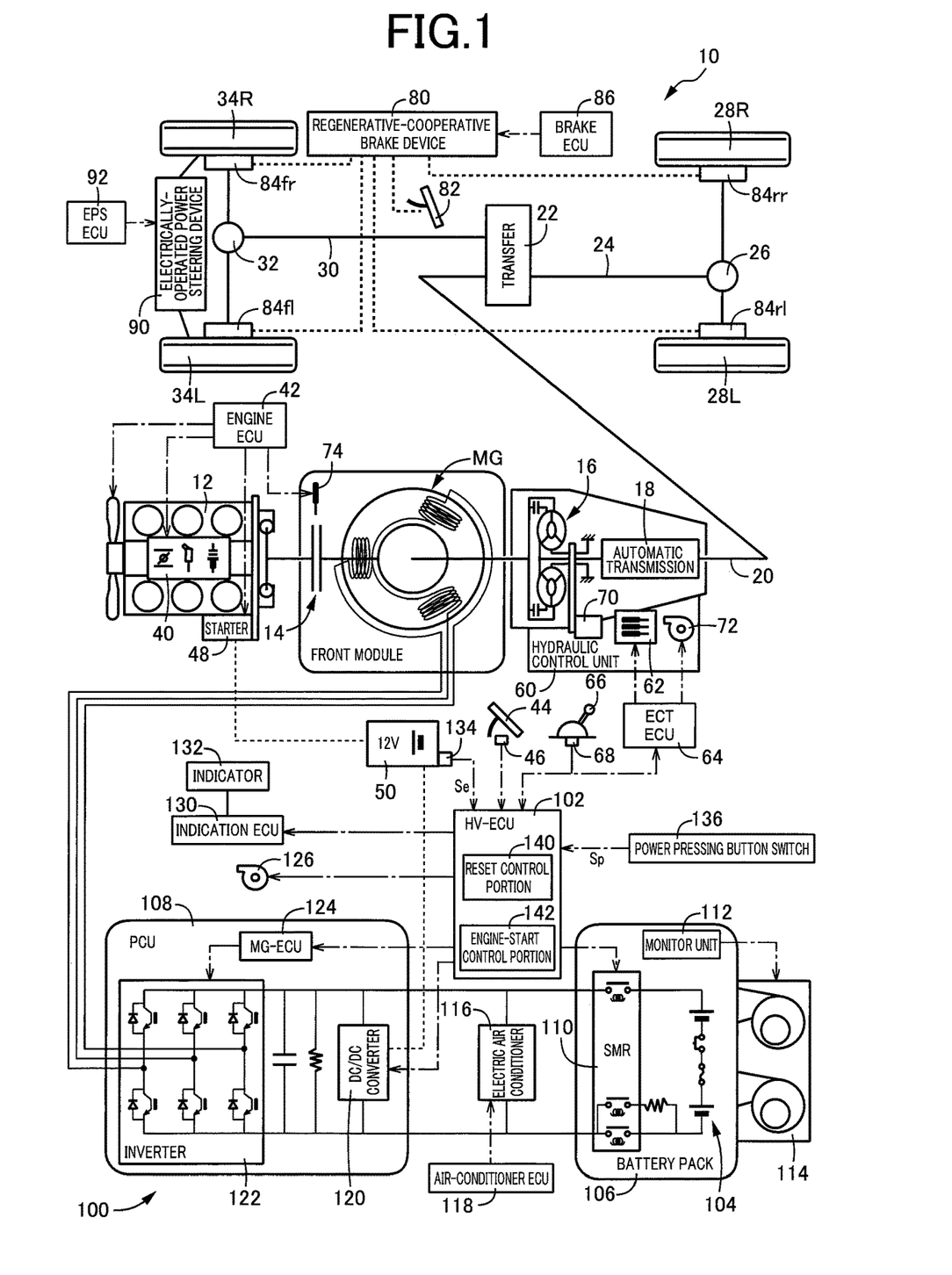
FIG. 1 is a view schematically showing a construction of a drive system of a hybrid electric vehicle to which the present invention is advantageously applied, and also a control circuit for a motor generator.

FIG. 1 is a view schematically showing a construction of a drive system of a hybrid electric vehicle 10 to which the present invention is advantageously applied, together with a control circuit for a motor generator MG. The hybrid electric vehicle 10 is provided with drive power sources in the form of an engine 12 and a motor generator MG. The engine 12 is an internal combustion engine such as gasoline engine and diesel engine, which is configured to generate a drive power by combustion of a fuel. The motor generator MG, which serves as a selected one of an electric motor and an electric generator, is a three-phase AC synchronous motor, for example, and is connected to the engine 12 through a K0 clutch 14. The K0 clutch 14 is a connecting/disconnecting device that is provided between the engine 12 and the motor generator MG, so as to selectively connect and disconnect the engine 12 to and from a drive-power transmission path. The motor generator MG is disposed on one of opposite sides of the K0 clutch 14, which is closer to a torque converter 16 and an automatic transmission 18. An output of each of the engine 12 and the motor generator MG is to be transmitted to the automatic transmission 18 through the torque converter 16 as a fluid transmission device, and then transmitted from a transmission output shaft 20 to a transfer 22 for distributing the output between front and rear wheels 34, 28. The transfer 22 may be of part-time type by which a two-wheel drive system and a four-wheel drive system are selectively established in the vehicle 10, or of a full-time type by which the four-wheel drive system is always established in the vehicle 10. The drive power distributed to a rear wheel side is transmitted to the rear right and left drive wheels 28R, 28L through a rear-wheel-side output shaft 24 and a differential gear device 26. The drive power distributed to a front wheel side is transmitted to the front right and left drive wheels 34R, 34L through a front-wheel-side output shaft 30 and a differential gear device 32.

The engine 12 is provided with an engine control device 40 that includes an electronic throttle valve, a fuel injection device and an ignition device. With the engine control device 40 being controlled by an engine ECU 42, an output torque of the engine 12 is controlled, for example. "ECU" is an abbreviation of an electronic control unit (electronic control apparatus), and is a microcomputer including a CPU, a ROM and a RAM. The engine ECU 42 receives various information required for controlling the engine 12, which are supplied directly from sensors or indirectly through the HV-ECU 102 or other ECU via CAN communication or the like, wherein the information include an accelerator opening degree θacc (that is an amount of operation of the accelerator pedal 44) and an engine rotational speed Ne (that is a rotational speed of the engine 12). The accelerator opening degree θacc corresponds to a requested drive-power amount, and is detected by, for example, an accelerator operation-amount sensor 46 provided in the accelerator pedal 44. Further, with a starter 48 being controlled together with the engine control device 40 by the engine ECU 42, the engine 12 can be cranked and started by the starter 48. The starter 48 is an electric motor, and is connected to an auxiliary-device battery 50 from which a drive electric power of a low voltage (12V in the present embodiment) is to be supplied thereto. The auxiliary-device battery 50 is connected not only to the starter 48 but also various auxiliary devices such as the ECUs (e.g., the engine ECU 42, HV-ECU 102) and an electrically-operated power steering device 90, so as to supply the electric power to the various auxiliary devices as well as to the starter 48. It is noted that the auxiliary-device battery 50 corresponds to "second electric storage device" recited in the appended claims.

The automatic transmission 18 is a planetary-gear-type step-variable transmission configured to establish a plurality of gear positions having respective different gear ratios depending on engagement/release states of respective hydraulically-operated friction engagement devices such as clutches and brakes. The automatic transmission 18 is to be subjected to a shift control operation executed by an ECT-ECU 64 that is configured to control electromagnetic hydraulic control valves and switch valves of a valve body 62 provided in a hydraulic control unit (hydraulic control circuit) 60. The ECT-ECU 64 receives various information required for controlling the automatic transmission 18, which are supplied directly from sensors or indirectly through the HV-ECU 102 or other ECU via CAN communication or the like, wherein the information include the above-described accelerator opening degree θacc, an output rotational speed No of the automatic transmission 18 and an operation position Psh of a shift lever 66. The shift lever 66 is provided to select one of various ranges such as P range for parking, D range for forward running and R range for reverse running, depending the operation position Psh that is detected by a shift position sensor 68. The hydraulic control unit 60 is provided with a mechanical oil pump 70 and an electric oil pump 72, such that a hydraulic pressure is to be generated by operation of each of the oil pumps 70, 72. The mechanical oil pump 70 is connected to a pump impeller of the torque converter 16, for example, such that the mechanical oil pump 70 is to be rotated and driven by the engine 12 and the motor generator MG. The hydraulic control unit 60 is further provided with a K0 electromagnetic valve 74 that is configured to switch a hydraulic passage so as to selectively engage and release the K0 clutch 14. With the K0 electromagnetic valve 74 being controlled by the engine ECU 42, the K0 clutch 14 is selectively engaged and released whereby the engine 12 is selectively connected and disconnected to and from the drive-power transmission path.

The hybrid electric vehicle 10 is provided with a regenerative-cooperative brake device 80 that is to be controlled by a brake ECU 86. Specifically, in response to a depressing operation to a brake pedal 82, the wheel brakes 84$fr$, 84$fl$, 84$rr$, 84$rl$ provided for the respective front right and left drive wheels 34R, 34L and rear right and left drive wheels 28R, 28L are controlled by the brake ECU 86, such that the wheel brakes 84$fr$, 84$fl$, 84$rr$, 84$rl$ are cooperatively controlled, depending on a depressing operation force applied to the brake pedal 82 (depending on the depressing force applied to the brake pedal 82 and also a regenerative braking force generated by the motor generator MG when a regenerative control of the motor generator MG is executed), so as to generate suitable braking forces. The regenerative control of the motor generator MG is to be executed by the HV-ECU 102, for example, during deceleration running of the vehicle 10. Wheel-brake command values, which are to be calculated depending on the regenerative braking force, are supplied to the brake ECU 86 from the HV-ECU 102 via the CAN communication or the like, and the wheel brakes 84*fr*, 84*fl*, 84*rr*, 84*rl* are controlled in accordance with the wheel-brake command values supplied to the brake ECU 86. Although the wheel-brake command values are calculated in the HV-ECU 102 in the present embodiment, the wheel-brake command values may be calculated in the brake ECU 86 in place of in the HV-ECU 102. Further, a steering system, which is provided to control a steering angle of the front right and left drive wheels 34R, 34L, is provided with the electrically-operated power steering device 90 that is to be controlled by an EPS-ECU 92, so as to generate an assist force assisting a steering force upon operation of a steering wheel (not shown). The EPS-ECU 92 receives various information required for controlling the assist force, which are supplied directly from sensors or indirectly through the HV-ECU 102 or other ECU via the CAN communication or the like, wherein the information include a vehicle running speed V and a steering angle Φ, such that the assist force generated by the electrically-operated power steering device 90 is controlled depending on the running speed V and the steering angle Φ. The drive electric power is supplied to the electrically-operated power steering device 90 from the auxiliary-device battery 50.

An MG control unit (MG control circuit) 100 is connected to the motor generator MG such that a torque and a rotational speed Nm of the motor generator MG are controlled by the HV-ECU 102. The MG control unit 100 is provided with a battery pack 106 and a PCU (power control unit) 108. The battery pack 106 includes a high-voltage battery 104 capable of supplying the electric power of high voltage higher than 50V (about 244V in the present embodiment). The battery pack 106 is provided with an SMR (system main relay) 110, such that the electric power can be supplied from the high-voltage battery 104 to the motor generator MG and an electric air conditioner 116, with the SMR 110 being closed by the HV-ECU 102. The battery pack 106 is further provided with a monitor unit 112 and a battery-cooling fan unit 114, such that the battery-cooling fan unit 114 is operated, as needed, to prevent the battery pack 106 from being excessively heated. The electric air conditioner 116 is to be controlled by an air-conditioner ECU 118, depending on, for example, a preset temperature. It is noted that the high-voltage battery 104, which is configured to supply the electric power to the motor generator MG, corresponds to "(first) electric storage device" recited in the appended claims. It is also noted that the SMR 110, which is to be selectively closed and opened so as to selectively connect and disconnect the motor generator MG to and from the high-voltage battery 104, corresponds to "relay" recited in the appended claims.

The PCU 108 includes a DC/DC converter 120, an inverter 122 and an MG-ECU 124. The MG-ECU 124 is configured to control the inverter 122 in accordance with an MG command signal supplied from the HV-ECU 102, so as to cause the motor generator MG to function as the electric motor or the electric generator and control the torque of the motor generator MG. With the motor generator MG being caused to function as the electric motor, namely, to be used as the drive power source, it is possible to cause the hybrid electric vehicle 10 to run. With the motor generator MG being caused to function as the electric generator, it is possible to charge the high-voltage battery 104 with the electric power generated by the motor generator MG. The DC/DC converter 120 is configured to convert the high voltage of the high-voltage battery 104, into a voltage of 12V, for example, so as to charge the auxiliary-device battery 50 with the electric power whose voltage is 12V. The PCU 108 is provided with a PCU cooling water pump 126 that is to be operated, as needed, by the HV-ECU 102, such that the PCU 108 is cooled by a cooling fluid to prevent the PCU 108 from being excessively heated.

The HV-ECU 102 is configured to control operations of the engine 12 and the motor generator MG through the engine ECU 42 and the MG-ECU 124, for example, so as to establish a selected one of a plurality of running modes, which is to be selected depending on an operation state of the vehicle 10 that is defined by, for example, the accelerator opening degree θacc and the vehicle running speed V, wherein the plurality of running modes include an engine running mode (in which the vehicle 10 is caused to run with the engine 12 functioning as the drive power source) and an EV running mode (in which the vehicle 10 is caused to run with only the motor generator MG functioning as the drive power source). The HV-ECU 102 receives various information required for controlling the engine 12 and the motor generator MG, wherein the information include the engine rotational speed Ne and the MG rotational speed Nm. An indication ECU 130 is connected to the HV-ECU 102, such that various information relating to the vehicle 10 are indicated in an indicator 132 such as a multi information display, wherein the various information include the running mode, the running speed V, the operation position Psh of the shift lever 66 and remaining amounts of fuel and battery.

The HV-ECU 102 is connected to the other ECUs such as the engine ECU 42, MG-ECU 124 and ECT-ECU 64, through the CAN communication or the like, such that various command signals and various information required for control operations are supplied from the HV-ECU 102 to the other ECUs. Further, the HV-ECU 102 receives a voltage signal Se which is supplied from a voltmeter 134 provided in the auxiliary-device battery 50 and which represents a voltage Eb of the auxiliary-device battery 50, and also a power pressing button signal Sp which is supplied when a power pressing button switch 136 is operatively pressed. The power pressing button switch 136 corresponds to an ignition switch in a conventional engine drive vehicle, and is to be operatively pressed to establish a ready ON state in which the electric power is supplied to various parts of the vehicle 10 for enabling the vehicle 10 to start running. In the present embodiment, the power pressing button switch 136 is an automatic-return type switch.

The HV-ECU 102 corresponds to a control apparatus for the vehicle 10, and functionally includes a reset control portion 140 and an engine-start control portion 142 in addition to the above-described control operations for establishing a selected one of the plurality of running modes. The reset control portion 140 is configured to execute a reset processing, when the voltage Eb of the auxiliary-device battery 50 is reduced to not higher than a predetermined reset determination value, for example, upon cranking start of the engine 12 by the starter 48, to execute a reset processing. With the reset processing being executed by the reset control portion 140, the operations of the starter 48 and the auxiliary devices to which the electric power is supplied from the auxiliary-device battery 50 are sopped, and the SMR 110 is opened whereby the high-voltage battery 104 is disconnected from the MG control unit 100.

Figure 2:
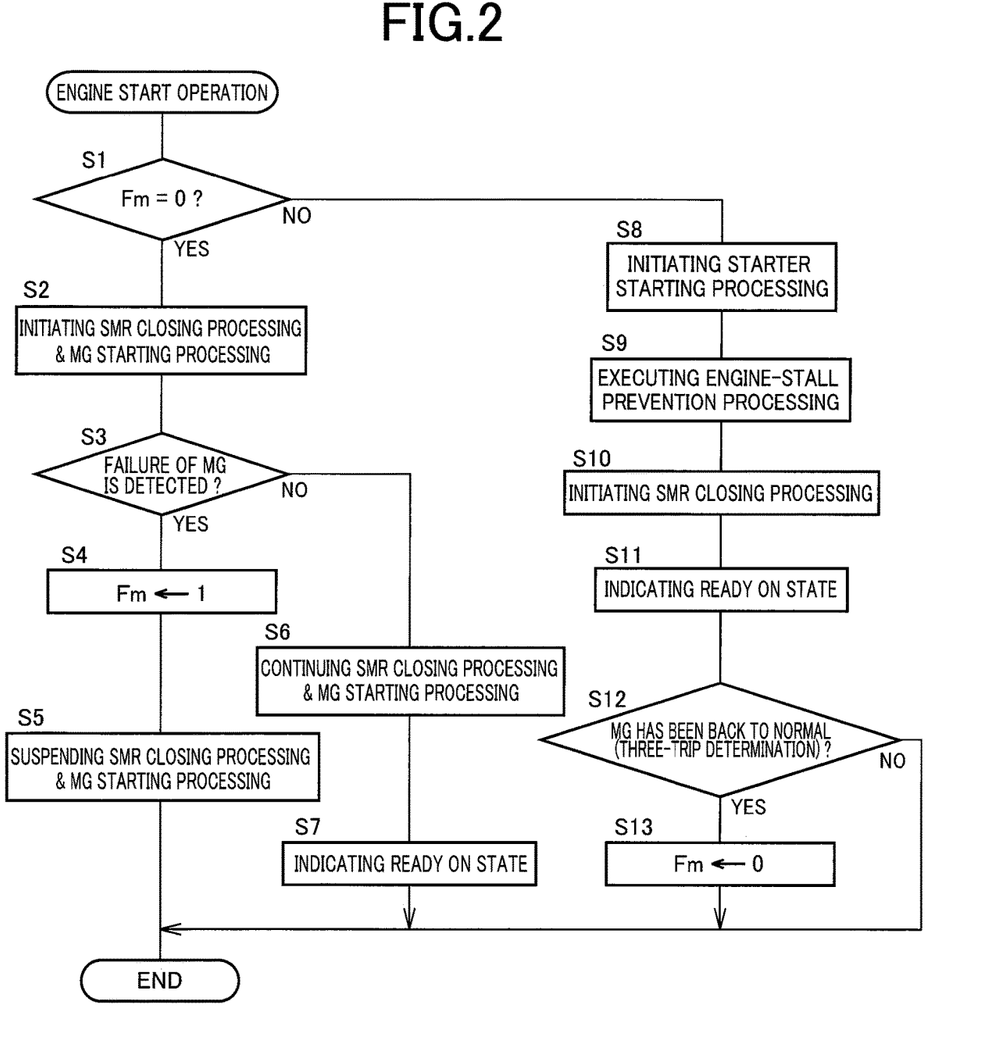
FIG. 2 is a flow chart for specifically explaining operations of an engine-start control portion that is functionally included in an HV-ECU shown in FIG. 1.

The engine-start control portion 142 is provided to crank and start the engine 12 when an engine start operation is made by a driver of the vehicle 10, and is configured to execute a signal processing, i.e., a control routine including steps S1 through S13 that are shown in flow chart of FIG. 2. The control routine of FIG. 2 is executed in response to the engine start operation that is made by, for example, operatively depressing and pressing the brake pedal 82 and the power pressing button switch 136, respectively, when the vehicle 10 is stopped with the P range being established. The control routine is initiated with step S1 that is implemented to determine whether an MG failure flag Fm is "0" or not. The MG failure flag Fm corresponds to a memory portion configured to memorize whether failure of the electric motor MG is present or absent. Initially, the MG failure flag Fm is "0" that indicates that the electric motor MG is normally working. In the event of failure of the motor generator MG in which the motor generator MG cannot be used for cranking the engine 12, the MG failure flag Fm is set to "1" at step S4. That is, in the present embodiment, the motor generator MG in addition to the starter 48 can be used as an engine starting means for cranking and starting the engine 12. At step S1, it is determined whether the motor generator MG can be used as the engine starting means for cranking the engine 12, or not. The motor generator MG corresponds to an electric motor that is to be used for cranking the engine 12.

When it is determined at step S1 that the MG failure flag Fm is "0", namely, when an affirmative determination (YES) is made at step S1, step S2 is implemented whereby an SMR closing processing and an MG starting processing are initiated so as to close the SMR 110 and start the engine 12 by the motor generator MG. The SMR closing processing is made by connecting a plurality of set of contacts included in the SMR 110, in accordance with a predetermined process. Specifically, in the MG starting processing, the K0 clutch 14 is engaged through the engine ECU 42, and the engine 12 is cranked by the motor generator MG with the SMR 110 being closed to allow supply of the electric power of the high voltage to the motor generator MG, such that the engine 12 is started with the engine control device 40 being controlled through the engine ECU 42. Step S2 is followed by step S3 that is implemented to make a determination as to whether the failure of the electric motor MG is present or absent. This determination can be made by reading result of diagnosis checking various parts of the motor generator MG, or made based on, for example, the MG rotational speed Nm, by the HV-ECU 102. The failure of the electric motor MG may be interpreted to mean not only failure of the motor generator MG itself but also failure of the inverter 122 or other part of the MG control unit 100.

When it is determined at step S3 that the failure of the electric motor MG is present, namely, when an affirmative determination (YES) is made at step S3, step S4 is implemented whereby the failure flag Fm is set to "1" that indicates that the electric motor MG is in failure. Step S4 is followed by step S5 that is implemented to suspend the SMR closing processing so as to place the SMR 110 back into its opened state, and to suspend the MG starting processing. With the MG starting processing being suspended, the vehicle driver is prompted to newly make the engine start operation. On the other hand, when it is determined at step S3 that the electric generator MG is normally working, namely, when a negative determination (NO) is made at step S3, the control flow goes to step S6 that is implemented to continue the SMR closing processing and the MG starting processing. Then, when the engine 12 is in a complete explosion state so as to be self-rotated with stability, step S7 is implemented to cause the indicator 132 to indicate that the engine 12 is in the ready ON state for enabling the vehicle 10 to start running.

In a case in which the engine start operation is newly made by the vehicle driver after the affirmative determination (YES) made at step S3 and the suspensions of the SMR closing processing and the MG starting processing at step S5, step S1 and the subsequent steps are implemented again. In that case, since the MG failure flag Fm has been set to "1" at step S4 in the previous execution of the control routine, a negative determination (NO) is made at step S1 so that the control flow goes to step S8 that is implemented to initiate a starter starting processing for starting the engine 12 by the starter 48. In the starter starting processing, which is executed through the engine ECU 42, the engine 12 is cranked by the starter 48 and the engine control device 40 is controlled so as to start the engine 12. Then, at step S9, an engine-stall prevention processing is executed to make it possible to smoothly perform the engine start control with use of the starter 48 that outputs a small torque. The engine-stall prevention processing is executed, for example, to reduce load of the starter 48 upon cranking of the engine 12, by delaying engagement of the K0 clutch 14, and to increase the torque of the engine 12, by making an amount of fuel injected to the engine 12 larger than in case of the engine start by the motor generator MG, so that the engine 12 can be started reliably and stably.

When the engine 12 is in the complete explosion state so as to be self-rotated with stability, step S10 is implemented to initiate the SMR closing processing, and then step S11 is implemented to cause the indicator 132 to indicate that the engine 12 is in the ready ON state for enabling the vehicle 10 to start running. Step S11 is followed by step S12 that is implemented to make a determination as to whether the motor generator MG has been back to normal, for example, by reading result of the diagnosis checking various parts of the motor generator MG. In this instance, the determination can be made by the HV-ECU 102, for example, through three-trip normality determination or the like. Then, when the motor generator MG has been back to normal, step S13 is implemented whereby the failure flag Fm is set to "0" that indicates that the electric motor MG is normally working.

As described, in the HV-ECU 102 as the control apparatus for the hybrid electric vehicle 10 according to the present embodiment, in the event of detection of failure of the electric motor MG (affirmative determination at step S3) when the engine start control is to be executed by cranking and starting the engine 12 by using the electric motor MG with the SMR 110 being closed, the engine-start control portion 142 causes the SMR 110 to be opened and suspends execution of the engine start control by using the electric motor MG (at step S5). Then, when the start of the engine 12 is requested next, namely, when the engine start operation is made next, the engine start control is executed by using the starter 48 while the SMR 110 is kept opened (at step S8). That is, when the start of the engine 12 cannot be made by the electric motor MG, the engine 12 is started by the starter 48 with the SMR 110 being kept opened, so that there is no risk of occurrence of the arcing phenomenon even in a case in which voltage applied to the starter 48 is reduced upon the start of the engine 12 by the starter 48, whereby the engine 12 can be appropriately started by the starter 48, with the SMR 110 being avoided from being fused due to the arcing phenomenon.

Further, the engine-start control portion 142 includes the MG failure flag Fm as the memory portion configured to memorize whether the failure of the electric motor MG is present or absent, and the engine-start control portion 142 is configured to execute the engine start control by using the selected one of the starter 48 and the electric motor MG, which is selected depending on whether the MG failure flag Fm is "0" or "1". Owing to this arrangement, the engine 12 can be appropriately started, with the contacts of the SMR 110 being avoided from being fused, depending on whether the failure of the electric motor MG is present or absent.

Further, each of the engine 12 and the electric motor MG is used as the drive power source for driving the vehicle 10. Since the electric power is supplied to the motor generator MG through the SMR 110 from the high-voltage battery 104 that outputs the high voltage not lower than 50V, the arcing phenomenon could occur when the SMR 110 is opened and the SMR 110 could be fused due to the arcing phenomenon. Therefore, it is possible to remarkably obtain the effect of the invention that the fusing of the relay contacts due to the arcing phenomenon can be prevented by cranking and starting the engine 12 by the starter 48 while keeping the SMR 110 to be opened.

Further, the starter 48 is to be rotated with supply of the electric power from the auxiliary-device battery 50 as the second electric storage device which is configured to output the low voltage lower than the high voltage of the high-voltage battery 104 the first electric storage device and which is used as the electric power source for supplying the electric power to the auxiliary devices, wherein the HV-ECU 102 as the control apparatus includes the reset control portion 140 configured, when the voltage Eb of the auxiliary-device battery 50 becomes not higher than the predetermined reset determination value, to execute the reset processing for stopping the operation of the starter 48 and causing the SMR 110 to be opened. If the voltage Eb of the auxiliary-device battery 50 is reduced to be not higher than the predetermined reset determination value when the engine 12 is to be cranked and started by the starter 48 with the SMR 110 being left closed, the SMR 110 could be fused due to the arcing phenomenon that could occur upon execution of the reset processing. However, in the present embodiment, since the engine starting processing is executed by the starter 48 with the SMR 110 being kept opened, it is possible to remarkably obtain the effect of the invention that the fusing of the relay contacts due to the arcing phenomenon upon execution of the execution of the reset processing in the event of the voltage reduction of the auxiliary-device battery 50 can be prevented by cranking and starting the engine 12 by the starter 48 while keeping the SMR 110 to be opened.

Further, the engine start control is executed in response to the engine start operation made by the vehicle driver. In a case in which the engine 12 cannot be started by the electric motor MG as the engine starting means, if the engine starting means is automatically switched from the electric motor MG to the starter 48, an uncomfortable feeling could be given to the vehicle driver because the engine start is delayed due to, for example, processing required to open the SMR 110. However, in the present embodiment, in the case in which the engine 12 cannot be started by the electric motor MG, the execution of the engine start control is once suspended, and then the engine start control is executed by using the starter 48 while keeping the SMR 110 to be opened when the engine start operation is made next, namely, when the start of the engine 12 is requested next, so that an uncomfortable feeling is unlikely to be given to the vehicle driver.

While the preferred embodiment of the present invention has been described in detail by reference to the drawings, it is to be understood that the embodiment described above is given for illustrative purpose only, and that the present invention may be embodied with various modifications and improvements which may occur to those skilled in the art.

NOMENCLATURE OF ELEMENTS

10: hybrid electric vehicle
12: engine
48: starter
50: auxiliary-device battery (second electric storage device)
102: HV-ECU (control apparatus)
104: high voltage battery (first electric storage device)
110: SMR (relay)
140: reset control portion
142: engine-start control portion
MG: motor generator (electric motor)
Fm: MG failure flag (memory portion)

What is claimed is:

1. A control apparatus for a hybrid electric vehicle including an engine, a starter and an electric motor which is connected to an electric storage device through a relay and which is to be rotated with supply of an electric power from the electric storage device,
   the control apparatus comprising an engine-start control portion configured to execute an engine start control to crank and start the engine by using a selected one of the starter and the electric motor,
   wherein the engine-start control portion is configured to detect presence or absence of failure of the electric motor, when executing the engine start control by using the electric motor with the relay being closed, and
   wherein the engine-start control portion is configured, when detecting the failure of the electric motor, to cause the relay to be opened, and to suspend execution of the engine start control by using the electric motor, and is configured, when start of the engine is requested next, to execute the engine start control by using the starter while keeping the relay to be opened, and to cause the relay to be closed after the start of the engine.

2. The control apparatus according to claim 1,
   wherein the engine-start control portion includes a memory portion configured to memorize whether the failure of the electric motor is present or absent, and
   wherein the engine-start control portion is configured to execute the engine start control by using the selected one of the starter and the electric motor, which is selected depending on content memorized in the memory portion.

3. The control apparatus according to claim 1,
   wherein each of the engine and the electric motor is used as a drive power source for driving the vehicle, and
   wherein the electric storage device is configured to output a high voltage not lower than 50V.

4. The control apparatus according to claim 1,
   wherein the starter is to be rotated with supply of the electric power from a second electric storage device that is other than the electric storage device as a first electric storage device, the second electric storage device being configured to output a low voltage lower than a voltage of the first electric storage device, and being used as an electric power source for supplying the electric power to auxiliary devices, and
   wherein the control apparatus comprises a reset control portion configured, when the voltage of the second electric storage device becomes not higher than a predetermined reset determination value, to execute a reset processing for stopping an operation of the starter and causing the relay to be opened.

5. The control apparatus according to claim 1, wherein the engine-start control portion is configured to execute the engine start control by using the selected one of the starter and the electric motor, when an engine start operation is made by a driver of the vehicle.

* * * * *